United States Patent [19]

Ando et al.

[11] Patent Number: 4,510,218
[45] Date of Patent: Apr. 9, 1985

[54] ELECTROLYTE FOR ZINC-BROMINE STORAGE BATTERIES

[75] Inventors: Yasuo Ando; Toshihiko Ochiai, both of Tokyo, Japan

[73] Assignee: Kabushiki Kaisha Meidensha, Tokyo, Japan

[21] Appl. No.: 547,572

[22] Filed: Nov. 1, 1983

[30] Foreign Application Priority Data

Nov. 2, 1982 [JP] Japan ................................ 57-191875

[51] Int. Cl.³ .............................................. H01M 4/58
[52] U.S. Cl. ..................................... 429/198; 429/101; 429/105; 429/199
[58] Field of Search ................ 429/101, 105, 199, 201, 429/50, 198

[56] References Cited

U.S. PATENT DOCUMENTS

| 3,660,170 | 5/1972 | Rampel | 136/154 |
| 3,944,430 | 3/1976 | Lee | 429/201 |
| 4,068,046 | 1/1978 | Eustace et al. | 429/105 |
| 4,147,840 | 4/1979 | Walsh et al. | 429/50 |
| 4,206,269 | 6/1980 | Putt et al. | 429/105 |
| 4,306,003 | 12/1981 | Henriksen | 429/101 |

Primary Examiner—Donald L. Walton
Attorney, Agent, or Firm—Fleit, Jacobson, Cohn & Price

[57] ABSTRACT

A negative electrolyte for electrolyte circulation-type storage batteries has a composition basically comprising zinc bromide as an active material and this active material is mixed with specified amounts of quaternary ammonium bromides of heterocyclic compounds such as morpholine, pyridine and pyrrolidine or ammonia as a bromine complexing agent and a dendrite inhibitor with or without specified amounts of $Sn^{2+}$ and $Pb^{2+}$.

9 Claims, 2 Drawing Figures (ON CHARGE)

$Zn^{++} + 2e^- \rightarrow Zn$  $2Br^- \rightarrow Br_2 + 2e^-$, $Br_2 + Br^- \rightarrow Br_3^-$ $ZnBr_2 \rightarrow Zn - Br_2$ (ON CHARGE)

$Zn^{++} + 2e^- \rightarrow Zn \quad 2Br^- \rightarrow Br_2 + 2e^-, \quad Br_2 + Br^- \rightarrow Br_3^-$ $ZnBr_2 \rightarrow Zn - Br_2$

ELECTROLYTE FOR ZINC-BROMINE STORAGE BATTERIES

BACKGROUND OF THE INVENTION

The present invention relates to an electrolyte for use in electrolyte circulation-type zinc-bromine storage batteries and more particularly to the composition of a negative electrolyte capable of inhibiting the formation of zinc dendrites.

Zinc-bromine storage batteries have been studied and developed from old times for their use in practical applications in view of their high energy densities and in recent years their development for practical applications has been spotlighted again from the standpoint of effective energy utilization. For instance, in FIG. 1 showing a basic construction of an electrolyte circulation-type zinc-bromine storage battery, numeral 1 designates a unit cell, 2 a positive electrode chamber, 3 a negative electrode chamber, 4 a separator (e.g., an ion exchange membrane or fine porous membrane separator), 5 a positive electrode, 6 a negative electrode, 7 a positive electrolyte, 8 a negative electrolyte, 9 a positive electrolyte storage tank, 10 a negative electrolyte storage tank, and 11 and 12 pumps.

With this type of electrolyte circulation-type zinc-bromine storage battery, as shown in FIG. 2, during the charge the zinc deposited on the surface of the negative electrode 6 designated at ⊖ in the Figure frequently tends to become uneven and cause the formation of tree-like crystals or so-called dendrites 13 due to nonuniformity of the electric field and disturbance in the flow of the negative electrolyte in the vicinity of the negative electrode surface, and in particular the following problems will be caused as the number of charge and discharge cycles is increased. The deposited dendritic zinc is very fragile so that it tends to fall off the electrode and deteriorate the energy efficiency of the battery. Even if the dendrites do not fall off the electrode, the dendrite 13 continues to grow in a branching form so that it penetrates and breaks the separator 4 and a short-circuit is formed between it and the positive electrode 5 thus eventually causing damage to the battery.

While various kinds of inhibitors, such as, nonionic surface active agents, zinc electrochemical plating brighteners, etc., have been used for the purpose of preventing the above-mentioned dendrite formation, due to the fact that these agents have relatively small effects when used singly and that an inexpensive fine porous membrane is usually used for the separator 4, during the charge the bromine produced at the positive electrode penetrates through the fine-porous membrane separator and diffuses within the negative electrode chamber. As a result, from the standpoint of resistance to the bromine there are problems that the dendrite inhibitor is gradually decomposed due to the strong oxidation of the bromine making it impossible to maintain the stable performance for the cyclic use over a long period of time and so on. In addition, as compared with the lead storage battery, an electrical resistance of the electrolyte is large in the zinc-bromine storage battery so that while many different kinds of electrolyte additives have been conceived for improving the voltage efficiency, their use in practical applications has required that the proper concentration of each of such additives be grasped in consideration of the interaction with the dendrite inhibitor used.

The inventors, etc., have investigated into the causes for the formation of dendrites in the electrolyte circulation-type zinc-bromine storage battery and have discovered and invented a negative electrolyte composition capable of suppressing the formation of dendrites during the charge of the zinc-bromine storage battery as the result of repeated tests performed by adding to the negative electrolyte mixtures of the negative electrolyte active material, i.e., zinc bromide, specific amounts of various bromine complexing agents and suitable amounts of various dendrite inhibitors and electric conductivity improvers in accordance with the results of the investigations.

SUMMARY OF THE INVENTION

It is the primary object of the present invention to provide a novel negative electrolyte composition which overcomes the most serious disadvantage of the zinc-bromine storage batteries, i.e., the formation and growth of dendrites and ensures its cyclic use over a long period of time.

In accordance with an embodiment of the invention there is thus provided a negative electrolyte for electrolyte circulation-type zinc bromine storage batteries comprising a mixture of a zinc bromide active material, a bromine complexing agent comprising at least one of methyl ethyl morpholinium bromide and methyl ethyl pyrrolidinium bromide and a dendrite inhibitor comprising a quaternary ammonium salt of morpholine, pyridine, pyrrolidine or ammonia having one or more ligands selected from the group consisting of —CH$_3$, —C$_4$H$_9$, —C$_{10}$H$_{21}$, —C$_{12}$H$_{25}$ and

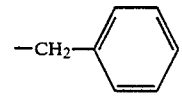

In accordance with a second embodiment of the invention there is provided a negative electrolyte which differs from the first embodiment in that bivalent tin and lead ions are added to the dendrite inhibitor.

In accordance with a third embodiment of the invention there is provided a negative electrolyte which differs from the second embodiment in that an electrical conductivity improver comprising potassium chloride and/or ammonium chloride is added.

DESCRIPTION OF THE PREFERRED EMBODIMENTS

Figure 1:
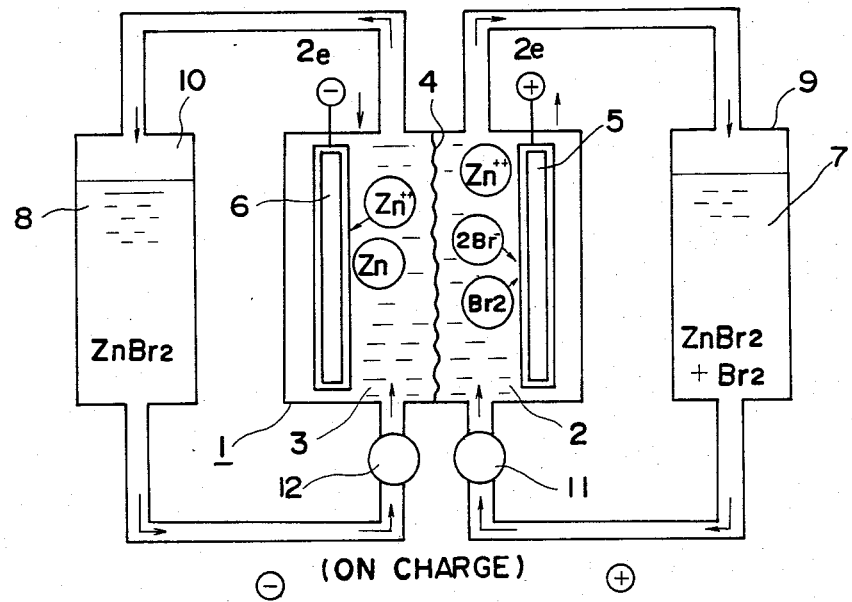
FIG. 1 is a schematic diagram showing a basic construction of an electrolyte circulation-type zinc-bromine storage battery.
Figure 2:
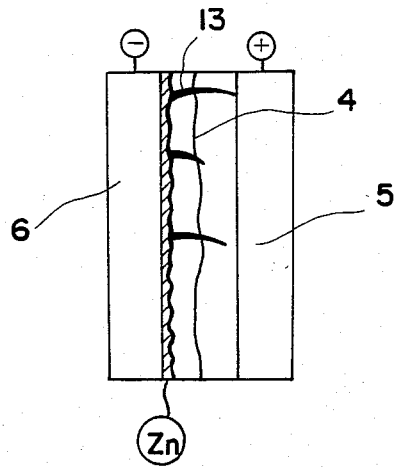
FIG. 2 is a schematic diagram showing the manner of growth of dendrites.

In this invention, zinc bromide (ZnBr$_2$) is used as the active material of a negative electrolyte in an electrolyte circulation-type zinc-bromine storage battery and this zinc bromide plays the principal role in the electrochemical reaction. Since the zinc bromide decreases from 3 mol/l to 1 mol/l during the charge, its most preferable concentration before the charge is 3 mol/l since the concentration of less than 1 mol/l is not practical. Added further is a bromine complexing agent which serves the function of preventing the deterioration of the battery system on the whole due to the strong oxidation property of the bromine which is generated at the positive electrode, penetrates through the fine-porous membrane separator and diffuses toward the negative electrode. Heterocyclic quaternary ammonium salts having the following constitutions are effective as the bromine complexing agents. Methyl ethyl morpholinium bromide

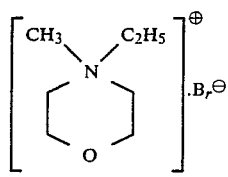

and methyl ethyl pyrrolidinium bromide

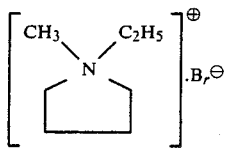

Experiments conducted by adding 1 mol/l of either one of these agents to the negative electrolyte have shown that there is the effect of reducing the ill effects of the bromine diffused from the positive electrode and that this effect is improved by using a mixture of the two agents.

In addition to the above-mentioned two bromine complexing agents, the negative electrolyte of this invention is added to the zinc bromide active material a dendrite inhibitor comprising for example one of twelve additives (a) to (l) having the following quaternary ammonium salt constitutions. More specifically, the additives are quaternary ammonium salts of ammonia or heterocyclic compounds such as morpholine, pyridine and pyrrolidine, and which quaternary ammonium salts having one or more ligands selected from the group consisting of —$CH_3$, —$C_4H_9$, —$C_{10}H_{21}$, —$C_{12}H_{25}$ and

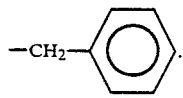

It has been discovered that the addition in a specified amount of one of these additives results in a negative electrolyte that ensures a practical cyclic operation with reduced dendrite formation which is one of the objects of the invention.

The kinds, constitutional formulas and specified contents of the dendrite inhibitors (a) to (l) are as follows.

(a) Methyl dodecyl morpholinium bromide added in an amount from $1 \times 10^{-4}$ mol/l to $1 \times 10^{-2}$ mol/l

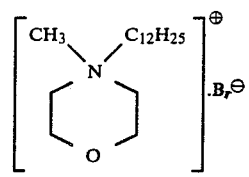

(b) Methyl decyl morpholinium bromide added in an amount from $1 \times 10^{-3}$ mol/l to $5 \times 10^{-2}$ mol/l

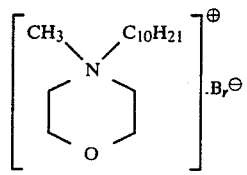

(c) Trimethyl dodecyl ammonium bromide added in an amount from $1 \times 10^{-3}$ mol/l to $1 \times 10^{-2}$ mol/l

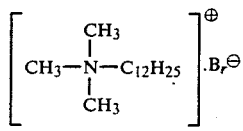

(d) Trimethyl decyl ammonium bromide added in an amount from $1 \times 10^{-3}$ mol/l to $5 \times 10^{-2}$ mol/l

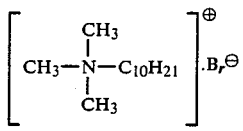

(e) Dimethyl benzyl dodecyl ammonium bromide added in an amount from $1 \times 10^{-5}$ mol/l to $1 \times 10^{-4}$ mol/l

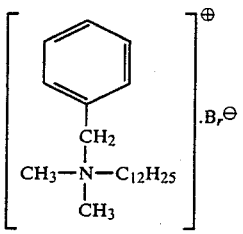

(f) Dimethyl benzyl decyl ammonium bromide added in an amount from $1 \times 10^{-5}$ mol/l to $1 \times 10^{-4}$ mol/l

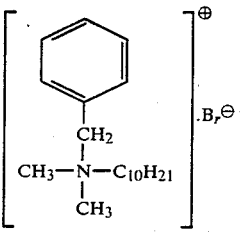

(g) Tetra buthyl ammonium bromide added in an amount from $1 \times 10^{-3}$ mol/l to $3 \times 10^{-2}$ mol/l

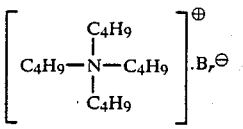

-continued (h) Tributhyl benzyl ammonium bromide added in an amount from $5 \times 10^{-5}$ mol/l to $1 \times 10^{-4}$ mol/l

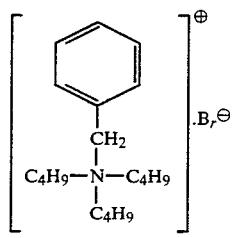

(i) Dodecyl pyridinium bromide added in a saturation amount

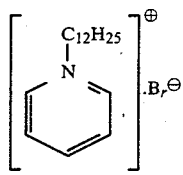

(j) Decyl pyridinium bromide added in a saturation amount

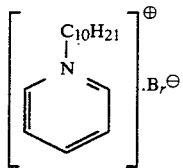

(k) Dodecyl methyl pyrrolidinium bromide added in a saturation amount

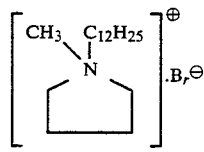

(l) Decyl methyl pyrrolidinium bromide added in a saturation amount

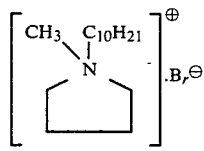

Also, it has been discovered that the addition of less than the saturation amount of bivalent tin ions ($Sn^{2+}$) in the form of a salt of $SnCl_2$, $SnBr_2$, $Sn_nSO_4$ or the like and of $1 \times 10^{-5}$ mol/l to less than the saturation amount of bivalent lead ions ($Pb^{2+}$) in the form of a salt of $PbCl_2$, $PbBr_2$, $PbSO_4$ or the like to the methyl dodecyl morpholinium bromide of (a) and the methyl decyl morpholinium bromide of (b) which have exhibited excellent properties as the dendrite inhibitors in the charge and discharge tests and the performance tests which will be described later, results in a negative electrolyte which is capable of not only preventing the occurrence of dendrites but also electrodepositing the zinc smoothly on the electrode over a large number of charging and discharging cycles.

Further, in order to improve the voltage efficiency of the above-described negative electrolyte composition, 3 mol/l or less of potassium chloride (KCl) and/or 4 mol/l or less of ammonium chloride is added as a conductivity improver and also the pH of the electrolyte is maintained 4 or less and the liquid temperature is maintained between $-20°$ and $60°$ C., thereby substantially completely eliminating the formation of dendrites on the negative electrode, producing a lustrous electrodeposited surface on the negative electrode and maintaining the initial condition in the practical operation.

Some examples of the invention will now be described.

EXAMPLE 1

Negative electrolytes for an electrolyte circulation-type zinc-bromine storage battery such as shown in FIG. 1 were prepared by adding one of the previously mentioned twelve dendrite inhibitors (a) to (l) to a basic mixture containing zinc bromide having a concentration of 3 mol/l and 0.5 mol/l each of methyl ethyl morpholinium bromide and methyl ethyl pyrrolidinium bromide as bromine complexing agents and 6-hour charging tests with a current density of 40 mA/cm$^2$ were conducted using the prepared electrolytes and carbon black plastic electrodes for the electrode. At the expiration of six hours, the formation of dendrites on the electrodes and the smoothness of the electrodeposited surfaces were respectively observed and evaluated according to the following criteria.

A: No formation of dendrites with the smooth electrodeposited surface.

B: Formation of small amount of dendrites with the relatively smooth electrodeposited surface.

C: Formation of large amount of dendrites with the nonuniform electrodeposited surface.

Note that the mark "+" at the right upper side of A, B and C denotes a better evaluation. The mark "−" denotes a slightly inferior evaluation.

Of these electrolytes, 31 electrolytes which were evaluated as A were subjected to a performance test of 20 cycles each comprising a 6-hour charge and 6-hour discharge with a current density of 30 mA/cm$^2$.

The test results are shown in the following Table 1.

TABLE 1

| | Evaluation of electrode conditions produced by various electrolyte compositions | | | | | |
|---|---|---|---|---|---|---|
| | Dendrite Inhibitor | | | | Evaluation | |
| Test No. | Item Kind | Content (mol/l) | Electrode condition | | Charge | Performance |
| Comparative example | No bromine complexing agent | — | Formation of large amount of dendrites, falling off electrode | | C | C |
| Comparative example | Bromine complexing agent only | — | Formation of dendrites, some falling off electrode | | C+ | C |
| 1-1 | (a) | 0.05 | Moss-like electrodeposit | | C | X |
| 2 | " | 0.04 | No dendrite, smooth | | A+ | A+ |

TABLE 1-continued

Evaluation of electrode conditions produced by various electrolyte compositions

| Test No. | Dendrite Inhibitor Item Kind | Content (mol/l) | Electrode condition | Evaluation Charge | Performance |
|---|---|---|---|---|---|
| 3 | " | 0.01 | No dendrite, smooth electrodeposit | $A^+$ | $A^+$ |
| 4 | " | 0.005 | No dendrite, smooth electrodeposit | $A^+$ | $A^+$ |
| 5 | " | 0.001 | No dendrite, smooth electrodeposit | $A^+$ | $A^+$ |
| 6 | " | $5 \times 10^{-4}$ | No dendrite, smooth electrodeposit | A | A |
| 7 | " | $2 \times 10^{-4}$ | No dendrite, somewhat irregular electrodeposited surface | B | X |
| 2-1 | (b) | 0.05 | Moss-like electrodeposit | C | X |
| 2 | " | 0.03 | No dendrite, smooth electrodeposit | A | A |
| 3 | " | 0.01 | No dendrite, smooth electrodeposit | A | A |
| 4 | " | 0.005 | No dendrite, fine irregularities | $A^-$ | $A^-$ |
| 5 | " | 0.002 | No dendrite, some irregularities | B | X |
| 3-1 | (c) | 0.03 | Moss-like electrodeposit | C | X |
| 2 | " | 0.01 | No dendrite, smooth electrodeposit | $A^+$ | $A^+$ |
| 3 | " | 0.005 | No dendrite, smooth electrodeposit | $A^+$ | $A^+$ |
| 4 | " | 0.001 | No dendrite, smooth electrodeposit | A | A |
| 5 | " | $5 \times 10^{-4}$ | No dendrite, slightly irregular electrodeposit | B | X |
| 4-1 | (d) | 0.05 | No dendrite, smooth electrodeposit | $A^+$ | $A^+$ |
| 2 | " | 0.01 | No dendrite, smooth electrodeposit | $A^+$ | $A^+$ |
| 3 | " | 0.005 | No dendrite, smooth electrodeposit | A | A |
| 4 | " | 0.001 | No dendrite, smooth electrodeposit | A | A |
| 5 | " | $5 \times 10^{-4}$ | No dendrite, slightly irregular electrodeposit | B | X |
| 5-1 | (e) | $1 \times 10^{-4}$ | No dendrite, smooth electrodeposition | $A^+$ | $A^+$ |
| 2 | " | $5 \times 10^{-5}$ | No dendrite, smooth electrodeposition | $A^+$ | $A^+$ |
| 3 | " | $1 \times 10^{-5}$ | No dendrite, smooth electrodeposition | A | A |
| 4 | " | $5 \times 10^{-6}$ | No dendrite, slightly irregular electrodeposit | B | X |
| 6-1 | (f) | $1 \times 10^{-4}$ | No dendrite, smooth electrodeposit | $A^+$ | $A^+$ |
| 2 | " | $5 \times 10^{-5}$ | No dendrite, smooth electrodeposit | $A^+$ | $A^+$ |
| 3 | " | $1 \times 10^{-5}$ | No dendrite, smooth electrodeposit | A | A |
| 4 | " | $5 \times 10^{-6}$ | No dendrite, slightly irregular electrodeposit | B | X |
| 7-1 | (g) | 0.03 | No dendrite, smooth electrodeposit | $A^+$ | $A^+$ |
| 2 | " | 0.01 | No dendrite, smooth electrodeposit | $A^+$ | $A^+$ |
| 3 | " | 0.005 | No dendrite, smooth electrodeposit | A | A |
| 4 | " | 0.001 | No dendrite, smooth electrodeposit | A | A |
| 5 | " | $5 \times 10^{-4}$ | No dendrite, slightly irregular electrodeposit | B | X |
| 8-1 | (h) | $1 \times 10^{-4}$ | No dendrite, smooth electrodeposit | $A^+$ | $A^+$ |
| 2 | " | $5 \times 10^{-5}$ | No dendrite, smooth electrodeposit | A | A |
| 3 | " | $1 \times 10^{-5}$ | No dendrite, slightly irregular electrodeposit | B | X |
| 9 | (i) | Saturation | No dendrite, smooth electrodeposit | A | A |
| 10 | (j) | " | No dendrite, smooth electrodeposit | A | A |
| 11 | (k) | " | No dendrite, smooth electrodeposit | A | A |
| 12 | (l) | " | No dendrite, smooth electrodeposit | A | A |

TABLE 1-continued

| | Dendrite Inhibitor | | | Evaluation | |
|---|---|---|---|---|---|
| Test No. | Item Kind | Content (mol/l) | Electrode condition | Charge deposit | Performance |

It will be seen from the Table 1 that the prevention of the formation of dendrites and the production of a smooth electrodeposited surface on the negative electrode were ensured in the battery charge and discharge tests conducted by adding specified amounts of the previously mentioned additives, i.e., the quaternary ammonium bromides (a) to (l) to the zinc-bromine storage battery negative electrolyte composition containing a fixed amount of zinc bromide and a fixed amount of each of methyl ethyl morpholinium bromide and methyl ethyl pyrrolidinium bromide as bromine complexing agents (i.e., the test electrolytes evaluated as A). The results of the 20 cycles of the 6-hour charge and 6-hour discharge performance test on the class A test electrolytes showed that the electrolytes containing the methyl dodecyl morpholinium bromide of (a) retained the best electrode smoothness even after the 20 cycles of the performance test. On the other hand, the electrolytes containing the methyl decyl morpholinium bromide of (b) and the trimethyl decyl ammonium bromide of (d) were excellent and the other electrolytes containing the other kinds of dendrite inhibitors were not evaluated as B or C throughout the performance tests. Among the inhibitors, those in which the total number of carbons combined with the four dative bonds of the nitrogen was between 12 and 10 showed the best results and the others in which the number of such carbons was 8 or less, or 20 or over did not show any excellent results even for the first electrodeposition.

EXAMPLE 2

As in the case of the Example 1, the negative electrolytes for an electrolyte circulation-type zinc-bromine storage battery were prepared by adding to 3 mol/l of zinc bromide 0.5 mol/l of each of methyl ethyl morpholinium bromide and methyl ethyl pyrrolidinium bromide as bromine complexing agents and further adding to the same $Sn^{2+}$ and $Pb^{2+}$, the dendrite inhibitors (a) and (b) which showed the excellent properties in the Example 1 and KCl and $NH_4Cl$ as electrical conductivity improvers as shown in the following Table 2. Then, using each of the prepared electrolytes, the battery was charged for 8 hours with a current density of 30 $mA/cm^2$ to deposit the zinc on the electrode consisting of a carbon plastic electrode having an effective electrode area of 400 $cm^2$ and the resulting electrodeposited surface conditions were observed and evaluated in accordance with the same criteria as the Example 1.

The results of these tests are shown in the following Table 2. As will be seen from the appended reference photographs 1 and 2 showing respectively the electrodeposited surfaces of the test cases 14-8 and 14-9, the addition of 2 mol/l of ammonium chloride as the conductivity improver (the photograph 1) produced a smooth electrodeposited surface and the addition of 3 mol/l of ammonium chloride (the photograph 2) produced an electrodeposited surface with minute roughness.

TABLE 2

Evaluation of electrodeposited surface conditions produced by various electrolyte compositions

| Test No. | Item | Dendrite inhibitor content (mol/l) | | | | Conductivity improver (mol/l) | | Electrodeposited surface condition | Evaluation |
|---|---|---|---|---|---|---|---|---|---|
| | | $Sn^{2+}$ | $Pb^{2+}$ | a | b | Kcl | $NH_4Cl$ | | |
| Comparative example | | — | — | — | — | — | — | Formation of dendrites on entire surface | C |
| 13-1 | | $5 \times 10^{-4}$ | $1 \times 10^{-5}$ | $1 \times 10^{-3}$ | — | — | — | Formation of small amount of dendrites | B |
| 2 | | " | $5 \times 10^{-5}$ | " | — | — | — | | A+ |
| 3 | | " | $1 \times 10^{-4}$ | " | — | — | — | | A+ |
| 4 | | " | $5 \times 10^{-4}$ | " | — | — | — | | A+ |
| 5 | | " | " | $3 \times 10^{-3}$ | — | — | — | | A+ |
| 6 | | " | " | $5 \times 10^{-3}$ | — | — | — | | A+ |
| 7 | | " | " | $1 \times 10^{-4}$ | — | — | — | Small amount of dendrites | B |
| 8 | | " | " | $5 \times 10^{-4}$ | — | — | — | | A+ |
| 9 | | " | " | $1 \times 10^{-2}$ | — | — | — | | B |
| 10 | | " | " | — | $1 \times 10^{-3}$ | — | — | | B |
| 11 | | " | " | — | $5 \times 10^{-3}$ | — | — | | A+ |
| 12 | | " | " | — | $1 \times 10^{-2}$ | — | — | | A+ |
| 13 | | " | " | — | $5 \times 10^{-2}$ | — | — | Blacked electrodeposited surface | B |
| 14-1 | | " | " | $1 \times 10^{-3}$ | — | 1 | — | | A+ |
| 2 | | " | " | " | — | 2 | — | | A+ |
| 3 | | " | " | " | — | 3 | — | Kcl Precipitation in negative electrolyte | C |
| 4 | | " | " | " | — | " | 1 | | A+ |
| 5 | | " | " | " | — | " | 2 | | A+ |
| 6 | | " | " | " | — | " | 3 | | A+ |
| 7 | | " | " | " | — | " | 4 | Roughened electrodeposited surface | B |
| 8 | | " | $5 \times 10^{-5}$ | $3 \times 10^{-3}$ | — | — | 2 | | A+ |

TABLE 2-continued

Evaluation of electrodeposited surface conditions produced by various electrolyte compositions

| Test No. | Item | Dendrite inhibitor content (mol/l) | | | | Conductivity improver (mol/l) | | Electrodeposited surface condition | Evaluation |
|---|---|---|---|---|---|---|---|---|---|
| | | $Sn^{2+}$ | $Pb^{2+}$ | a | b | Kcl | $NH_4Cl$ | | |
| 9 | | " | " | " | — | — | 3 | | $A^+$ |

From the results shown in Table 2 it will be seen that the charge and discharge tests conducted by using the zinc-bromine storage battery negative electrolytes each containing an active material or zinc bromide of a fixed concentration, methyl ethyl morpholinium bromide and methyl ethyl pyrrolidinium bromide of fixed concentrations as bromine complexing agents, $Sn^{2+}$ and $Pb^{2+}$ as dendrite inhibitors, one or the other of the previously mentioned quaternary ammonium bromides, i.e., the methyl dodecyl morpholinium bromide (a) and the methyl decyl morpholinium bromide (b) and potassium chloride and ammonium chloride of varying contents as conductivity improvers, eliminated the formation of dendrites and allowed the observation of smooth electrodeposited surfaces on the negative electrode surface within the specified ranges of concentrations (the test electrolytes evaluated as $A^+$). As a result, the composition ranges of the negative electrolytes are specified. By virtue of the specified composition ranges of the negative electrolytes, the formation of dendrites was prevented and the smooth electrodeposition of zinc on the negative electrode surface was effected. In addition, the results of the service tests conducted by using the negative electrolytes of the specified composition ranges showed that there were no problem and the utility of these electrolytes were proved even after 20 cycles of the charge and discharge test. It was also proved under the operating conditions that the most satisfactory results were obtained in the cases where the pH value in the negative electrolytes was 4 or less and the liquid temperature was in the range from $-20°$ C. to $60°$ C.

EXAMPLE 3

In this example, the similar apparatus as used in the Example 1 was used and the negative electrolyte used contained the same zinc bromide and bromine complexing agents as used in the Example 1 as well as $1 \times 10^{-4}$ mol/l of $Pb^{2+}$, $5 \times 10^{-4}$ mol/l of $Sn^{2+}$ and $3 \times 10^{-3}$ mol/l of methyl dodecyl morpholinium bromide as a dendrite inhibitor and 2 mol/l of ammonium chloride as a conductivity improver. The 8-hour charge and discharge cycle test with a current density of 40 mA/cm$^2$ was repeated with the result that the same electrodeposited surface as at the beginning was maintained even after over 20 cycles and the utility of the electrolyte was proved.

From the foregoing description it will be seen that when the negative electrolyte according to the invention is used in a zinc-bromine storage battery, there is practically no danger of causing the formation of dendrites and the production of a smooth electrodeposited surface is ensured without any deterioration of the efficiency and the life. Thus, the negative electrolyte is useful in that the conventional electrical resistance of negative electrolyte of as high as 10 to 20 $\Omega$cm is reduced to several to 10 $\Omega$cm by the combination of various additives and the problem of a reduced efficiency due to the electrical resistance of negative electrolyte is overcome thereby making possible the practical use of the electrolyte.

Thus, by using the negative electrolyte according to the invention in an electrolyte circulation-type zinc-bromine storage battery for multiple charge and discharge cyclic purposes, there is the effect that not only the formation of dendrites on the negative electrode is prevented satisfactorily but also the danger of any decomposition of additive due to the strong oxidizing property of the bromine penetrating and diffusing into the negative electrode chamber through the fine-porous membrane separator during the charge is eliminated owing to the dendrite inhibitors themselves being quaternary ammonium salts and this, coupled with the addition of the bromine complexing agents, has the effect of causing the bromine molecules to trap as polyhalides thereby improving the battery efficiency.

What is claimed is:

1. A negative electrolyte for an electrolyte circulation-type zinc-bromine storage battery comprising a mixture of an active material consisting of zinc bromide; a bromine complexing agent consisting of at least one of methyl ethyl morpholinium bromide and methyl ethyl pyrrolidinium bromide; a dendrite inhibitor including at least one compound selected from the group consisting of a quaternary ammonium salt of morpholine, pyridine, pyrrolidine and ammonia; and bivalent lead and tin ions, said ammonium salt having at least one ligand selected from the group consisting of $-CH_3$, $-C_4H_9$, $-C_{10}H_{21}$, $-C_{12}H_{25}$ and

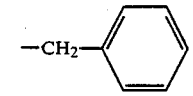

2. A negative electrolyte according to claim 1 wherein said dendrite inhibitor comprises an element selected from the group consisting of methyl dodecyl morpholinium bromide, methyl decyl morpholinium bromide, trimethyl dodecyl ammonium bromide, trimethyl decyl ammonium bromide, dimethyl benzyl dodecyl ammonium bromide, dimethyl benzyl decyl ammonium bromide, tetra buthyl ammonium bromide, tributhyl benzyl ammonium bromide, dodecyl pyridinium bromide, decyl pyridinium bromide, dodecyl methyl pyrrolidinium bromide and decyl methyl pyrrolidinium bromide.

3. A negative electrolyte according to claim 2, wherein said selected element of said dendrite inhibitor has a specified content in the following range

| | specified content |
|---|---|
| Methyl dodecyl morpholinium bromide | $1 \times 10^{-4}$ mol/l to $1 \times 10^{-2}$ mol/l |
| Methyl decyl morpholinium bromide | $1 \times 10^{-3}$ mol/l to $5 \times 10^{-2}$ mol/l |
| Trimethyl dodecyl ammonium | $1 \times 10^{-3}$ mol/l to |

-continued

| | specified content |
|---|---|
| bromide | $1 \times 10^{-2}$ mol/l |
| Trimethyl decyl ammonium bromide | $1 \times 10^{-3}$ mol/l to $5 \times 10^{-2}$ mol/l |
| Dimethyl benzyl dodecyl ammonium bromide | $1 \times 10^{-5}$ mol/l to $1 \times 10^{-4}$ mol/l |
| Dimethyl benzyl decyl ammonium bromide | $1 \times 10^{-5}$ mol/l to $1 \times 10^{-4}$ mol/l |
| Tetra buthyl ammonium bromide | $1 \times 10^{-3}$ mol/l to $3 \times 10^{-2}$ mol/l |
| Tributhyl benzyl ammonium bromide | $5 \times 10^{-5}$ mol/l to $1 \times 10^{-4}$ mol/l |
| Dodecyl pyridinium bromide | Saturation amount |
| Decyl pyridinium bromide | Saturation amount |
| Dodecyl methyl pyrrolidinium bromide | Saturation amount |
| Decyl methyl pyrrolidinium bromide | Saturation amount |

4. A negative electrolyte according to claim 1, wherein said dendrite inhibitor comprises methyl dodecyl morpholinium bromide or methyl decyl morpholinium bromide and $Sn^{2+}$ and $Pb^{2+}$.

5. A negative electrolyte according to claim 4, wherein said dendrite inhibitor comprises less than a saturation amount of $Sn^{2+}$, from $1 \times 10^{-5}$ mol/l to less than a saturation amount of $Pb^{2+}$, and from $a \times 10^{-4}$ mol/l through $1 \times 10^{-2}$ mol/l of methyl dodecyl morpholinium bromide or from $1 \times 10^{-3}$ mol/l through $5 \times 10^{-2}$ mol/l of methyl decyl morpholinium bromide.

6. A negative electrolyte according to claim 1, wherein said dendrite inhibitor further comprises an electrical conductivity improver.

7. A negative electrolyte according to claim 6, wherein said conductivity improver comprises at least one of potassium chloride and ammonium chloride.

8. A negative electrolyte according to claim 7, wherein said electrical conductivity improver comprises 3 mol/l or less of potassium chloride and 4 mol/l or less of ammonium chloride.

9. A negative electrolyte according to claim 6, wherein said storage battery is operated such that said negative electrolyte has a pH value of 4 or less and a liquid temperature ranging from $-20°$ through $60°$ C.

* * * * *